United States Patent Office 3,616,600
Patented Nov. 2, 1971

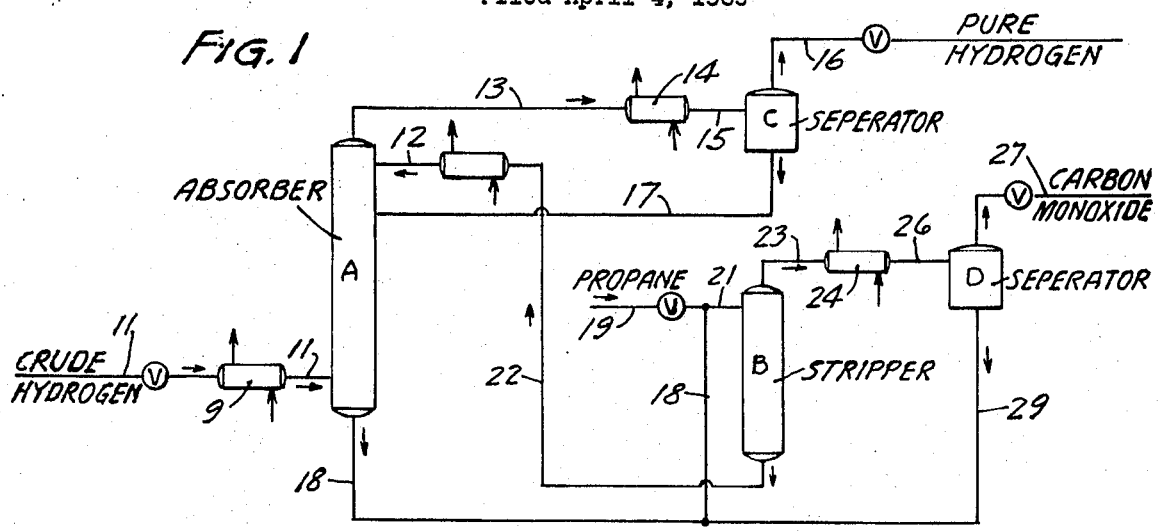

3,616,600
GAS PURIFICATION PROCESS
Fred Kurata and George W. Swift, Lawrence, Kans., assignors to The Kansas University Endowment Association, Lawrence, Kans.
Continuation-in-part of application Ser. No. 606,900, Jan. 3, 1967. This application Apr. 4, 1969, Ser. No. 813,676
Int. Cl. B01d 47/06
U.S. Cl. 55—48                                      5 Claims

ABSTRACT OF THE DISCLOSURE

Treatment of raw hydrogen to remove low boiling impurities such as carbon monoxide by scrubbing the raw hydrogen with liquefied propane.

---

This application is a continuation-in-part of our prior and copending application S.N. 606,900, filed Jan. 3, 1967 and now U.S. Patent No. 3,455,116.

This invention relates to the purification of low boiling gases. Generally the invention relates to the removal of low boiling impurities such as carbon monoxide from a raw hydrogen stream.

Raw hydrogen consists of about 95 to 98 mol percent hydrogen and about 5 mol percent or less of carbon monoxide as the major impurity with traces of methane and other hydrocarbons. In some instances the raw hydrogen may contain as much as 1 or 2 mol percent nitrogen in addition to the carbon monoxide. The raw hydrogen may be produced as a by-product of various refinery processes or as the primary product of a process designed for hydrogen synthesis. Raw hydrogen may be used directly as a feedstock for various processes such as hydrogenation. Various degrees of purification may be required to provide hydrogen suitable for other purposes. For example, liquefied hydrogen is commonly used to fuel rocket engines. At the low temperature of the liquid hydrogen production, carbon monoxide may solidify and precipitate to foul the processing equipment system. To avoid fouling, hydrogen purity of greater than 99.995 percent is desirable for hydrogen liquefaction.

A cryogenic process for the purification of hydrogen is briefly described in "Chemical Engineering," May 13, 1963, pages 150 to 152. This purification process involves two different liquid solvents to remove the impurities from the entering hydrogen feed stream. The first solvent used is liquid methane which removes nitrogen and carbon monoxide impurities. The second solvent is liquid propane which is then used to remove methane from the purified hydrogen stream, not hydrogen or carbon monoxide which pass overhead with the purified hydrogen from the propane scrubbing step. The present invention utilizes a single liquid solvent such as propane or a higher boiling hydrocarbon or mixtures thereof to remove initially the nitrogen or carbon monoxide from the crude gas stream. Thereafter, no solvent treatment is necessary with a different solvent. Since a single solvent is utilized there is no necessity for treating the stream with a second solvent, thus materially improving the economy of the process. Furthermore, the use of propane permits a much wider temperature range in the absorber.

An object of the present invention is to provide a process for the removal of nitrogen and/or carbon monoxide from raw hydrogen.

Another object is to provide a process for making highly pure hydrogen.

Other objects and advantages of the present invention will become apparent from the accompanying description and disclosure.

In the process of the present invention, the major low boiling impurities, nitrogen or carbon monoxide, are removed from a raw hydrogen stream containing same by scrubbing with a suitable liquefied hydrocarbon solvent such as propane. The solvent should be such that replacement of impurity by solvent in the scrubbed pure gas gives a mixture more amenable to final cleanup, e.g., propane can be much more readily removed from hydrogen than can carbon monoxide (impurity) from hydrogen (product). Solvents of the paraffinic, naphthenic, and aromatic hydrocarbon families which are free from ethylenic unsaturation and mixtures thereof that remain liquid at a temperature down to about $-50$ or to about $-100°$ C. are suitable. Generally such solvents are relatively low boiling, usually having a boiling point below $60°$ C. at atmospheric pressure.

The product from the scrubber or absorber will then comprise purified hydrogen and a small amount of propane or other solvent, usually above 5 mol percent. The residual propane or other solvent in the purified hydrogen is then removed by cooling and phase separation or by other conventional techniques such as adsorption on activated carbon or other adsorbent bed whereby purified hydrogen is produced having a purity of 99.995 percent or higher.

Since the capacity and affinity of the adsorbent bed is much greater for hydrocarbons than for carbon monoxide or nitrogen, the adsorption, if this technique is used, can be carried out at a higher temperature and removal of propane is much more complete than for nitrogen or carbon monoxide. The purified hydrogen can also be permeated through quartz tubes or other material to remove the solvent and produce the purified product.

Another important aspect of this invention takes advantage of the reverse solubility of hydrogen in a hydrocarbon solvent. For most gases, the solubility of the gas in a hydrocarbon solvent increases with decreasing temperature at a given pressure. In the case of hydrogen, its solubility decreases with decreasing temperature over the majority of temperature range of interest for processing purposes.

In the initial scrubbing or absorbing process, some hydrogen will become dissolved in the solvent in addition to the carbon monoxide or nitrogen. Unless some steps are taken, the hydrogen dissolved in the solvent will be lost when the carbon monoxide or nitrogen is separated from the solvent. The dissolved hydrogen can be recovered by flashing the hydrocarbon solvent effluent from the scrubber or absorber to lower pressure in two or more stages at different temperatures. The gases removed by the low temperature flash will contain most of the dissolved hydrogen because of its low solubility. This gas can be recycled to the hydrogen feed stream. The gases flashed off at higher temperatures will be mostly carbon monoxide or nitrogen because of its lower solubility at higher temperatures. The temperatures and pressures selected for these flashes can be optimized to give maximum recovery of the hydrogen (product) from the hydrocarbon while minimizing vaporization of carbon monoxide and nitrogen.

The phase equilibrium relationships for the complete system must be known to take full advantage of the present technique, e.g., in the hydrogen-carbon monoxide-propane system the hydrogen demonstrates the reverse solubility phenomenon which favors good scrubbing action at reasonably high temperatures when conducted at elevated pressures. Also, in the same system, for the type of operation depicted in the accompanying process flow diagram of FIG. 1 of the drawings, one must take care to operate above the locus of critical solution points which corresponds closely to the vapor pressure of carbon monoxide. Accordingly, FIGS. 2 and 3 of the drawings show the ternary composition diagrams at selected temperatures and pressures for the hydrogen-carbon monoxide-propane system. These diagrams enables one to set the conditions for operation of the process as described in connection with the process illutrated in FIG. 1.

The accompanying FIG. 1 is a diagrammatic flowsheet illustrating a specific embodiment of the present invention. The accompanying data of Tables I and II below provide a material balance and operating conditions as a typical example of design operation for the process of FIG. 1. According to the drawing, raw hydrogen entering through conduit 11 is purified to produce a hydrogen product of 99.995 percent purity. The raw hydrogen enters the process at 510 p.s.i.a. and is cooled in precooler 9. The cooled gas is passed into absorber A. An essentially pure liquid propane scrubbing stream containing not more than 0.0003 percent carbon monoxide is passed through a cooler and conduit 12 into absorber A. Absorber A comprises a conventional absorption tower with a suitable number of trays or height of packing. A gaseous hydrogen stream is removed via conduit 13 from the top of absorber A saturated with propane but highly purified with respect to carbon monoxide. This hydrogen stream is cooled to $-50°$ C. in cooler 14 and passed into phase separator C through conduit 15. A hydrogen product of greater than 99.995 percent purity on a propane free basis is withdrawn as a gas from the top of phase separator C through conduit 16. Although not shown in FIG. 1, the product gas in conduit 16 could be further purified by passing through a bed of activated carbon or other suitable adsorbent to increase purity.

energy by means not shown to boil the propane. A pure propane stream is withdrawn from the bottom of stripper B through conduit 22 and recycled through the stripper feed-effluent heat exchanger to the top of the absorber A.

A hydrogen and carbon monoxide gas mixture saturated with propane is withdrawn from the top of stripper B through conduit 23. The majority of propane is condensed from the hydrogen and carbon monoxide gas by cooling in heat exchanger 24. In the process of FIG. 1, the operating temperature and pressure of stripper B are sufficiently high that a large fraction of the cooling can be provided by cooling tower water which conserves on the process requirement for relatively expensive refrigeration.

The cooled stripper overhead stream is passed through conduit 26 to phase separator D. The condensed propane is recycled from the bottom of separator D through conduit 29 to the stripper B via conduits 18 and 21. A gaseous mixture of hydrogen, carbon monoxide, and propane is withdrawn from the top of separator D through conduit 27 and passed out of the process for use as fuel or other processing requirements.

If nitrogen is present in the raw hydrogen stream, it will be removed along with the carbon monoxide in conduit 27 of FIG. 1.

The process flowscheme of FIG. 1 was based upon the assumption of relatively low value of ray hydrogen and propane feedstreams and relatively high value for the fuel stream 27. In some processing situations, the differential between the value of the ray hydrogen and propane make-up streams and the value of the fuel stream 27 may be adequate to justify the expense of additional processing steps to reclaim most of the hy-

HYDROGEN PURIFICATION PROCESS

TABLE I.—MATERIAL BALANCE

| Stream No. | 11 | 12 | 13 | 15 | 16 | 17 | 18 | 19 | 21 | 22 | 23 | 26 | 27 | 29 |
|---|---|---|---|---|---|---|---|---|---|---|---|---|---|---|
| Mass flow, (lb. mols unit time) | 100 | 1586.94 | 65.1 | 65.1 | 52.04 | 13.06 | 1634.9 | 12.0 | 1970.0 | 1586.94 | 383 | 383 | 59.9 | 323.1 |
| Temp., °C | 0 | 0 | 0 | −50 | −8 | −8 | 0 | 25 | 75 | 82 | 75 | 0 | 0 | 0 |
| Comp., mol percent: | | | | | | | | | | | | | | |
| Hydrogen | 95.0 | Nil | 80.596 | 80.596 | 99.995 | 2.0850 | 2.60 | Nil | 2.53 | Nil | 13.02 | 13.02 | 71.7 | 2.13 |
| Carbon monoxide | 5.0 | Nil | 0.004 | 0.004 | 0.00472 | 0.00039 | 0.305 | Nil | 0.389 | Nil | 2.00 | 2.00 | 8.3 | 0.82 |
| Propane | 0.0 | 99.999+ | 19.40 | 19.40 | 0.00071 | 97.9146 | 97.095 | 99+ | 97.08 | 99+ | 84.98 | 84.98 | 20.0 | 97.05 |

TABLE II.—MAJOR PROCESS VESSEL OPERATING CONDITIONS

| | Vessel Number | | | | | | |
|---|---|---|---|---|---|---|---|
| | A | B | C | D | E | F | G |
| | Vessel Name | | | | | | |
| | Absorber | Stripper | Vapor liquid separator | Vapor liquid separator | Low stage suction knockout drum | High stage suction knockout drum | Refrigerant propane surge tank |
| Operating temp., °C: | | | | | | | |
| Top | 0 | 75 | | | | | |
| Bottom | 0 | 82 | −50 | 0 | −56 | −5 | 50 |
| Operating pressure, p.s.i.a. | 510 | 480 | 500 | 470 | 7 | 30 | 260 |

A liquid stream predominantly comprised of propane is recycled from the bottom of separator C through conduit 17 to absorber A to a separation stage well below the top of the asborber. Heat exchangers (not shown) are utilized to transfer energy from the feed streams to the effluent streams of separator C to economize on process energy requirements.

Liquid propane is removed from the bottom of absorber A through conduit 18 and passed through the propane stripper feed-effluent heat exchanger (not shown), and then is mixed with process make-up propane from conduit 19 and recycle propane from conduit 29 and is passed into the top of the propane stripper B through conduit 21. The propane stripper B comprises a conventional tower with sufficient mass transfer separation stages to provide a pure propane bottoms product which contains no more than 0.0003 percent carbon monoxide. The carbon monoxide is stripped from the propane by propane vapor which is generated at the bottom of the stripper B by addition of drogen and/or propane contained in stream 27. Such additional processing steps comprise cooling the flow through conduit 27 to between −10 and −50° C. to condense the majority of propane. The cooled stream would then be passed into an additional phase separator. Because of the reverse solubility of the hydrogen, a vapor phase comprising predominantly hydrogen with carbon monoxide contamination could be recycled from the top of this additional phase separator to the absorber A. Because of its higher solubility, a disproportionately higher concentration of carbon monoxide would be withdrawn with the liquid propane stream from the bottom of this additional phase separator.

The liquid propane with carbon monoxide contamination from the bottom of the phase separator would be flashed to provide a vapor phase containing essentially all of the contaminant carbon monoxide removed in the process. The vapor phase would be rejected from the process and the liquid propane phase would be recycled to the top of the stripper B.

The above is a description of one specific embodiment of the invention but it is to be understood that other operating conditions can be utilized to achieve similar results. Insofar as the temperature and pressure of the process of this invention are concerned, two liquid phases form in the propane-carbon monoxide system below −138.7° C. The upper temperature limit will be near the critical temperature of propane, 100° C. The formation of the second liquid phase below −138.7° C. can be avoided by proper selection of pressure or propane circulation rate. Therefore, absorber A can be operated down to the temperature where solid forms. In order to avoid the formation of a second liquid phase, absorber A can be operated at a pressure lower than the three phase locus pressure at temperatures below −138.7° C. Or, the propane circulation rate can be set so the carbon monoxide concentration will be less than the equilibrium concentration in the propane rich liquid layer when two liquid phases are present.

This means that above −138.7° C. the absorber A operating temperature and pressure can be set independently. Below −138.7° C. the tower pressure must be below the three phase pressure or the propane (or solvent) circulation rate can be set so that the second liquid phase does not form.

By operating at low temperature and high pressure in phase separator C the vapor pressure of propane is so low that the hydrogen may have the desired purity without further purification as is shown in the flow-scheme of FIG. 1 and the material balance and operating conditions of Tables I and II.

Economics will be the controlling factor in establishing the optimum operating temperatures and pressures for the various processing steps. For example, the required circulation rate for propane to the absorber can be decreased approximately 50 percent by increasing the absorber operating pressure from 500 p.s.i.a. to 1000 p.s.i.a. However, this decreased expense for propane circulation must be balanced against higher initial cost for equipment and higher cost for compressing the feed gas to the process operating pressure.

Having described our invention, we claim:

1. A process for making pure hydrogen which comprises introducing into a scrubbing zone raw gaseous hydrogen containing carbon monoxide as the major impurity, introducing into said scrubbing zone liquefied solvent comprising hydrocarbon substantially free from ethylenic unsaturation and having at least 2 carbon atoms per molecule and which boils below 60° C. and remains liquid at a temperature of −100° C., maintaining said scrubbing zone at a temperature, pressure and contact ratio betwen raw hydrogen and liquefied solvent such that the solvent remains liquid as a single phase and the raw hydrogen and its carbon monoxide impurity remain gaseous, removing liquefied solvent containing carbon monoxide impurity therein from said scrubbing zone, and removing from said scrubbing zone purified gaseous hydrogen.

2. A process for making pure hydrogen which comprises introducing into a scrubbing zone raw gaseous hydrogen containing carbon monoxide as the major impurity, introducing into said scrubbing zone a liquefied propane solvent, maintaining said scrubbing zone at a temperature above that at which solid forms and below +100° C. and under a pressure and a contact ratio between raw hydrogen and liquefied propane such that a gas phase and a single liquid phase are produced, removing liquefied propane from said scrubbing zone containing carbon monoxide impurity from said raw hydrogen, and removing from said scrubbing zone purified hydrogen.

3. A process for making pure hydrogen which comprises introducing into a scrubbing zone raw gaseous hydrogen containing carbon monoxide as an impurity, introducing into said scrubbing zone liquefied propane, maintaining said scrubbing zone at a temperature between about −139° C. and about +100° C. and under a pressure and a contact ratio between raw hydrogen and liquefied propane such that a gas phase and a single liquid phase are produced, removing liquefied propane from said scrubbing zone containing carbon monoxide impurity from said raw hydrogen, stripping carbon monoxide from said liquefied propane from said scrubbing zone, recycling stripped propane to said scrubbing zone, removing from said scrubbing zone purified hydrogen substantially free of carbon monoxide and containing propane, separating propane from said purified hydrogen and recovering purified hydrogen as a product of the process.

4. The process of claim 3 in which propane is separated from purified hydrogen by phase separation at reduced temperature.

5. The process of claim 3 in which all of the stripping of carbon monoxide from liquefied propane is carried out at superatmospheric pressure.

References Cited

UNITED STATES PATENTS

| 3,121,624 | 2/1964 | Matsch et al. | 55—48 |
| 3,239,458 | 3/1966 | Baumann et al. | 55—48 |

REUBEN FRIEDMAN, Primary Examiner

C. N. HART, Assistant Examiner

U.S. Cl. X.R.

55—68; 62—17